(12) United States Patent
Riquelme et al.

(10) Patent No.: US 11,580,883 B1
(45) Date of Patent: Feb. 14, 2023

(54) COMPACT DYNAMIC SIMULATOR OF THE HUMAN GASTROINTESTINAL SYSTEM

(71) Applicant: NotCo Delaware, LLC, Santiago (CL)

(72) Inventors: Angeline Riquelme, Santiago (CL); Sofia Estrugo, Santiago (CL); Francisca Villanueva, Santiago (CL); Rodrigo Muñoz-González, Santiago (CL); Ana Batista-Gonzalez, Santiago (CL); Rodrigo A. Contreras, Santiago (CL)

(73) Assignee: NotCo Delaware, LLC, Santiago (CL)

( * ) Notice: Subject to any disclaimer, the term of this patent is extended or adjusted under 35 U.S.C. 154(b) by 0 days.

(21) Appl. No.: 17/835,750

(22) Filed: Jun. 8, 2022

Related U.S. Application Data

(60) Provisional application No. 63/303,148, filed on Jan. 26, 2022.

(51) Int. Cl.
*G09B 23/00* (2006.01)
*G09B 23/30* (2006.01)

(52) U.S. Cl.
CPC .................................. *G09B 23/303* (2013.01)

(58) Field of Classification Search
None
See application file for complete search history.

(56) References Cited

U.S. PATENT DOCUMENTS

| | | |
|---|---|---|
| 4,073,071 A | 2/1978 | Angelotti |
| 4,209,919 A | 7/1980 | Kirikae et al. |
| 5,338,198 A | 8/1994 | Wu et al. |

(Continued)

FOREIGN PATENT DOCUMENTS

| | | |
|---|---|---|
| CN | 202330391 U | 7/2012 |
| CN | 203596135 U | 5/2014 |

(Continued)

OTHER PUBLICATIONS

Molly et al. "Development of a 5-step multi-chamber reactor as a simulation of the human intestinal microbial ecosystem", Applied Microbiology and Biotechnology (1993) 39: 254-258, 5 pages.

(Continued)

*Primary Examiner* — James B Hull
(74) *Attorney, Agent, or Firm* — Haverstock & Owens, A Law Corporation

(57) ABSTRACT

A gastrointestinal simulator system includes a thermoregulated bath, two glass beakers situated within the thermoregulated water bath, and a pump. The beakers simulate the stomach and intestines and are coupled together using a tube. A sieve, positioned within the "stomach," has a plurality of 2 mm holes on its surface to mimic in vivo conditions, where only particles smaller than 2 mm in diameter are transferred to the "intestines." These collected particles move from "stomach" (specifically, from the sieve) to the "intestines" through the tube coupling the beakers. Cameras may be located inside the water bath for monitoring/recording of the digestion. Alerts, such as voice alerts, may be generated to notify users of any important information and instructions. After digestion, reports of the digestion are automatically generated and stored in a data repository. One or more users are notified that the reports are available for access.

14 Claims, 12 Drawing Sheets

(56) References Cited

U.S. PATENT DOCUMENTS

| | | | |
|---|---|---|---|
| 6,623,271 | B2 | 9/2003 | Pruden |
| 8,703,479 | B2 | 4/2014 | Marzorati et al. |
| 2019/0228681 | A1* | 7/2019 | Zhan ..................... G09B 23/32 |

FOREIGN PATENT DOCUMENTS

| | | | |
|---|---|---|---|
| CN | 105929121 A | 7/2018 | |
| CN | 105954476 A | 2/2019 | |
| FR | 3007181 A1 | 11/2016 | |
| WO | 2012/001314 A1 | 1/2012 | |
| WO | WO-2012165962 A1 * | 12/2012 | ........... B01D 61/147 |
| WO | 2013144710 A1 | 10/2013 | |

OTHER PUBLICATIONS

Barroso et al., The Computer-Controlled Multicompartmental Dynamic Model of the Gastrointestinal System SIMGI. In: Verhoeckx K, Cotter P, López-Expósito I, et al., editors. The Impact of Food Bioactives on Health: in vitro and ex vivo models [Internet]. Cham (CH): Springer; 2015. Chapter 28. Available from: https://www.ncbi.nlm.nih.gov/books/NBK500139/. 9 pages. Relevant page Nos. 320-322, 324-325.

Van de Wiele et al., The Simulator of the Human Intestinal Microbial Ecosystem (SHIME®) In: Verhoeckx K, Cotter P, López-Expósito I, et al., editors. The Impact of Food Bioactives on Health: in vitro and ex vivo models [Internet]. Cham (CH): Springer; 2015. Chapter 27. Available from: https://www.ncbi.nlm.nih.gov/books/NBK500150/. 13 pages. Relevant page Nos. 306-307, 312-313, 315.

Brodkorb et al. "INFOGEST static in vitro simulation of gastrointestinal food digestion", Nature Protocols, Mar. 18, 2019, 24 pages. Relevant page Nos. 1-20.

Mackie et al. "Simulating human digestion: developing our knowledge to create healthier and more sustainable foods", The Royal Society of Chemistry, Oct. 22, 2020, 35 pages. Relevant pp. 1-2 and 10-17.

Minekus et al., "A Multicompartmental Dynamic Computer-Controlled Model Simulating the Stomach and Small Intestine", Alternatives to Laboratory Animals: ATLA 23, 197-209, Mar. 1995, 14 pages. Relevant page Nos. 198-208.

Mulet-Cabero et al., "A standardised semi-dynamic in vitro digestion method suitable for food—an international consensus", The Royal Society of Chemistry, Feb. 10, 2020, 19 pages. Relevant page Nos. 1703-1709.

Tamargo et al., "Simulador gastrointestinal dinámico (simgi®): una herramienta potencialmente útil en nutrición clínica", Nutr Hosp. 2017; 34(6):1489-1496 ISSN 0212-1611—Coden Nuhoeq S.V.R. 318, 8 pages. Relevant page Nos. 1492-1493.

González et al., "Simulation of Human Small Intestinal Digestion of Starch Using an In Vitro System Based on a Dialysis Membrane Process", Foods 2020, 9, 913, Jul. 10, 2020, 22 pages. Relevant page Nos. 4-6.

Barros et al., "Development of an in vitro mechanical gastric system (IMGS) with realistic peristalsis to assess lipid digestibility", unedited manuscript accepted for publication in Food Research International (2016), 41 pages. Relevant page Nos. 16-18.

Williams et al., "Comparative Analysis of Intestinal Tract Models," Annual Review of Food Science and Technology 2015.6:14.1-14.22, Feb. 2015, 23 pages. Relevant page Nos. 14-7 to 14-10.

* cited by examiner

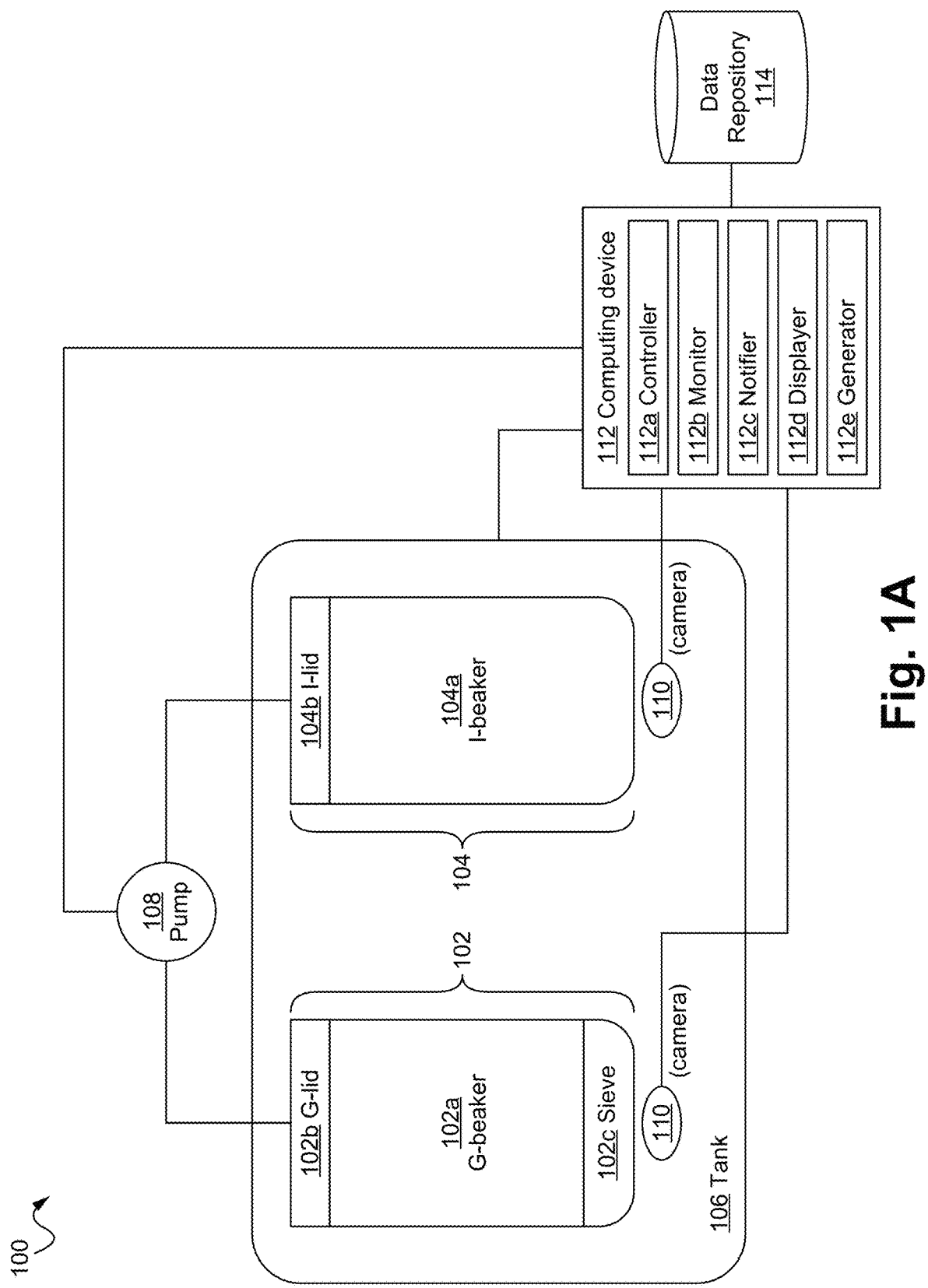

SHIGAD by NotCo

Sample Name:
Sample Number:
Weight (gr):
Scientist Name:
Date DD/MM/YY:

Comments:

Submit and start

Fig. 6A

SHIGAD by NotCo

Before start the digestion, please fill these parameters:

Digestion total time (min):
Gastric phase time (min):
Electrolyte solution volume (ml):
1st empty time (min):
Enzime solution volume (ml):

Submit and start

Scientist Name:
Sample Name:
Digestion Time:

Date:
Initial Weight:

Initial Comments:

Sample Composition:

| Lipid | Sample % | kcal/mL |
|---|---|---|
| Protein | | |
| Carbohydrates | | |
| Total Calories | | kcal/mL |
| Dry weight | | % |

| ORAL DIGESTION | | | | |
|---|---|---|---|---|
| Duration (time amylase is active in food) | | min | Salivary Amylase | IU/mL SSF |
| Final Volume oral phase | | mL | | |
| | | | Lot number | |
| Quantity of food | Salivary Amylase solution | | Activity IU/mg solid | |
| | | | U needed at | U/mL |
| Volume of eSSF | Water required to | | weight needed | mg |
| | | | concentration | mg of Amylase |
| 0.3M CaCl2 0H2O l2 | Sampling volume (if any) | | concentration | mg/mL in water |
| | | | volume of water | mL |
| GASTRIC PHASE | | | | |
| Basal | | | Gastric Lipase + Pepsin | |
| eSGF | | mL | With Gastric Lipase (RGE) | |
| HCl | M | mL | Gastic Lipase | U/mL SGF |
| 0.3M CaCl2 0H2O l2 | | mL | Supplier | |
| Water | | mL | lot number | |
| | | | Lipase Activity U/mg | |
| Enzyme solution | | mL | solid | |
| Total volume | | mL | | U needed at U/mL |
| Simulated gastric electrolyte mixture | | | weight needed | mg |
| eSGF | | mL | weighed | mg of RGE for 1tube |
| HCl | M | mL | concentration | mg/mL in eSGF |
| 0.3M CaCl2 0H2O l2 | | mL | volume of water mL | |
| Water | | mL | | |
| Total Volume | | mL | Pepsin | U/mL SGF |
| | | | Pepsin Activity U/mg | |
| | | | RGE solid | |
| | | | Total Pepsin Activity | |
| Note: no enzyme solution | | | needed | U needed at U/mL |
| Pepsin (Without use of gastric lipase) | | | Pepsin Activity U/mg | |
| Pepsin | U/mL SGF | | provided by RGE | U |
| | | | | |
| lot number | | | lot number | |
| Activity U/mg | | | | |
| solid | | | Activity U/mg solid | |
| | | | Pepsin activity U/mg | |
| | U needed at | U/mL | provided by Pepsin | U needed at U/mL |
| Weight needed | mg | | weight needed | mg |
| weighed | mg of pepsin | | weighed | mg of Pepsin |
| concentration | mg/mL in eSGF | | concentration | mg/mL in eSGF |
| volume of water | mL | | volume of water | mL |

| GASTRIC PHASE (continued) | | | |
|---|---|---|---|
| Gastric digestion step | | | |
| Volume of bolus | | mL | |
| Volume of eSGF | | mL | |
| RGE solution | | mL | |
| Pepsin solution | | mL | |
| 0.3MCaCl2O H2Ol2 | | mL | |
| *Variable volumes* | | | |
| HCl to reach pH 2.0 at | M | mL | |
| Water required to | mL* | mL | |
| Experimental Results | | | |
| pH and Temperature Plot: | | Phase Duration: | = |
| Comments: | | | |

| INTESTINAL PHASE | | | |
|---|---|---|---|
| Pancreatin | | Bile | |
| Pancreatin (TAME)U of trypsin/mL SF | | Bile mmol/L SF | |
| lot number | | lot number | |
| Activity U/mg solid | | concentration | mmol of bile salts/g bile |
| U needed | U/mL | mmols needed  mmol needed | mol/L |
| Weight needed | mg | Weight needed | mg |
| concentration | mg of pancreatin | concentration | mg/mL in eSF |
| volume of eSF | mL | volume of eSF | mL |
| Simulated intestinal electrolyte mixture | | Small intestinal digestion step (Pancreatin) | |
| eSF | mL | Duration | mins |
| HCl  M | mL | Volume of chyme | mL |
| 0.3MCaCl2O H2Ol2 | mL | Volume of eSF | mL |
| Water | mL | Pancreatin | mL |
| Total volume | mL | Bile | mL |
| | | Volume of 0.3MCaCl2O H2Ol2 | mL |
| Note: no enzyme solution | | Vol of 7M acid/base for pH 7.0 | mL |
| | | Water required to  mL | mL |
| | | Total volume to be removed for sample during intestinal stage (mL) | mL |
| | | Final intestinal volume | mL |
| Experimental Results | | | |
| pH and Temperature Plot: | | Phase Duration: | = |
| Comments: | | | |

Fig. 6F

COMPACT DYNAMIC SIMULATOR OF THE HUMAN GASTROINTESTINAL SYSTEM

BENEFIT CLAIM

This application claims the benefit under 35 U.S.C. § 119(e) of provisional application 63/303,148, filed Jan. 26, 2022, the entire contents of which are hereby incorporated by reference for all purposes as if fully set forth herein.

TECHNICAL FIELD

One technical feature of the present disclosure is a dynamic simulator of the human stomach and small intestine digestion. The disclosure relates, in particular, to an in vitro digestion model that simulates human gastrointestinal conditions.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Studying human digestibility of food is an essential step in the food industry, especially when new and innovative products are being developed. This is particularly important in the plant-based food industry, where every day new products are created, using unique and often completely new ingredients.

Digestion models can be categorized as either in vitro models or in vivo models. In certain situations, in vitro digestion models are preferred over in vivo digestion models because of their easy implementation, rapid sample processing and data acquisition, and not needing to use animals.

However, traditional in vitro digestion models are costly and inaccessible to most low-resource development teams and countries. Additionally, these traditional in vitro digestion models have been built to be of high capacity (volume). As such, the amounts of reagents and food products to be added during digestion is high, which makes these traditional digestion models expensive to operate.

What is needed is a simulator that allows the simulation of human gastrointestinal conditions, on a laboratory scale and at a lower production and operating cost, and that can be easily built.

SUMMARY

The appended claims may serve as a summary of the invention.

BRIEF DESCRIPTION OF THE FIGURES

FIG. 1A illustrates a block diagram of an example system, according to an embodiment.

FIG. 6A and FIG. 6B illustrate example graphical user interface implementations, according to an embodiment.

FIGS. 6C-6F illustrate example digital files, according to an embodiment.

DETAILED DESCRIPTION

Figure 1B:
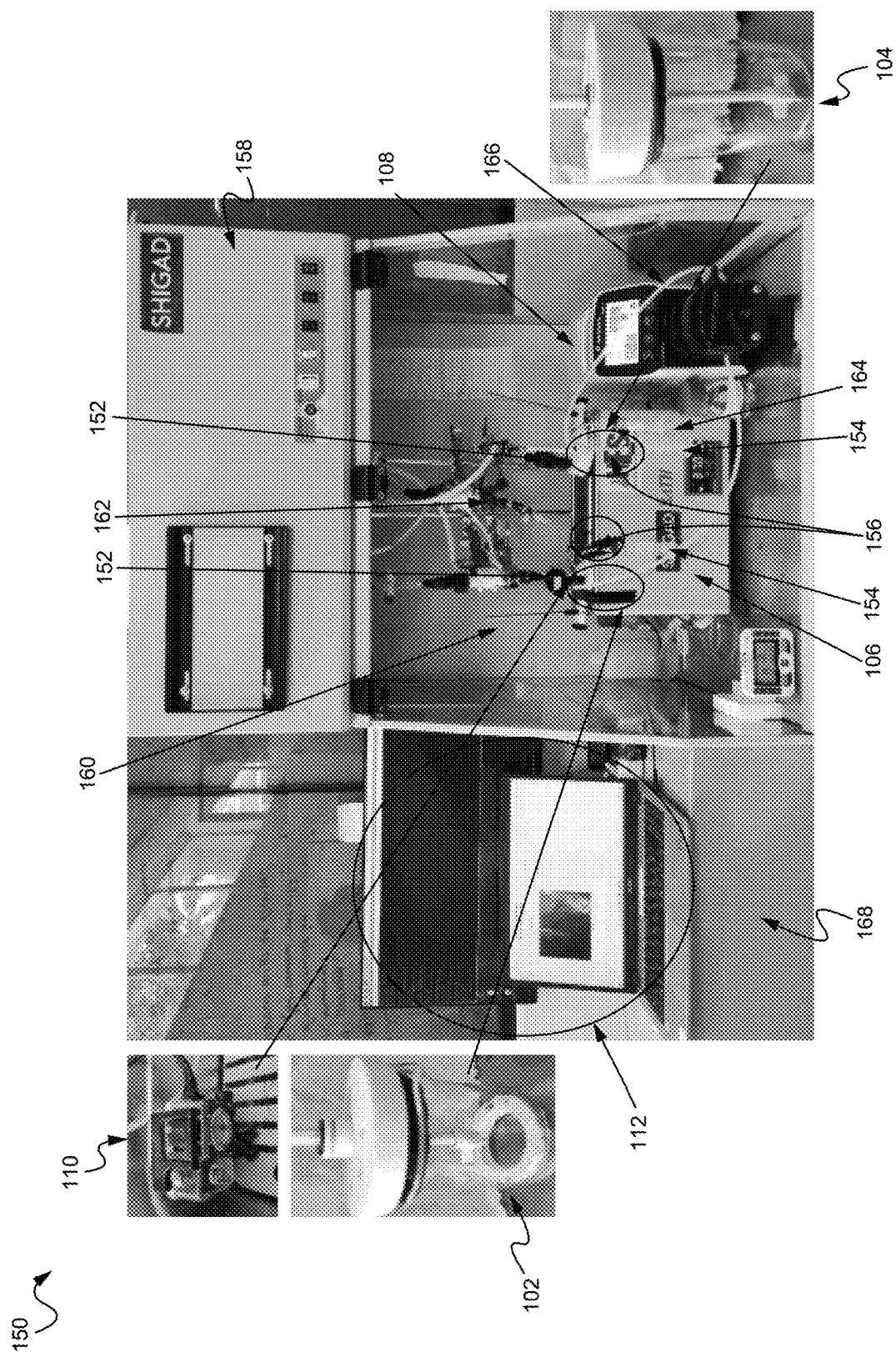
FIG. 1B shows a graphical image depicting a desktop gastrointestinal simulator system, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein in sections according to the following outline:

1.0 GENERAL OVERVIEW
2.0 STRUCTURAL OVERVIEW
3.0 FUNCTIONAL OVERVIEW
4.0 GRAPHICAL USER INTERFACE IMPLEMENTATIONS
5.0 PROCEDURAL OVERVIEW
6.0 HARDWARE OVERVIEW
7.0 SOFTWARE OVERVIEW
8.0 OTHER ASPECTS OF DISCLOSURE 1.0 General Overview The human gastrointestinal system has several organs, including the stomach, and small and large intestines. Techniques described herein relate to a dynamic, in vitro digestion model that replicates chemical and physical conditions of the stomach and the intestines. In embodiments of the digestion model of the present invention, a vessel simulates the stomach and mixes and digests food, while gastric electrolyte and enzyme solutions are delivered to the stomach vessel. The stomach vessel, connected to another vessel that simulates the intestines, is where specific physiological in vivo conditions are replicated to digest food. The dynamic digestion model is a low cost, low volume (capacity) simulator of the human gastrointestinal system, that can be easily built and operated on a laboratory scale.

Traditional simulators include SHIME (Simulator of Human Intestinal Microbial Ecosystem), SIMGI (SIMulator Gastro-Intestinal), TIM (TNO Gastro-Intestinal Model), and TIM2 (TNO Gastro-Intestinal Model of the colon). While these traditional simulators are excellent gastrointestinal simulators and are positioned as benchmarks in the market and in scientific studies of different food products and ingredients, they represent costly systems that are inaccessible to most low-resource countries. Additionally, these traditional simulators have been built to be of high capacity (volume), going from 200 to 400 mL, depending on the model. As such, the amounts of reagents and food products to be added is high, which makes these traditional simulators expensive to operate.

As further described herein, the dynamic digestion model of the present invention is a compact gastrointestinal simulator system that can operate on a desktop. In an embodiment, the gastrointestinal simulator system includes off the shelf components, keeping costs low, and 3D printed parts, making the gastrointestinal simulator system easily customizable. For example, the gastrointestinal simulator system includes a thermoregulated bath, two glass beakers situated within the thermoregulated water bath, and a pump. The beakers simulate the stomach and intestines and are coupled together using a tube. The pump facilitates emptying or movement of gastric food bolus from the "stomach" to the "intestines" through the tube. Lids for the glass beakers, stirrer paddles, and a sieve are 3-D printed. The sieve has a plurality of 2 mm pores across its surface to mimic, when in use, in vivo conditions where only particles smaller than 2 mm in diameter are transferred from the stomach to the intestines. Cameras may be located inside the water bath for monitoring/recording the digestion. (The term "digestion" refers to gastric digestion, intestinal digestion, or both, depending on context. Here, the term "digestion" refers to both gastric digestion and intestinal digestion.) Alerts, such as voice alerts, may be generated to notify users of any important information and instructions. After the digestion is completed, reports of the digestion are automatically generated and stored in a data repository for subsequent retrieval. One or more users may be automatically notified that the reports are available for access.

In one aspect, a desktop gastrointestinal simulator system is provided. The desktop gastrointestinal simulator system comprises a tank, a gastric compartment, and an intestinal compartment. The gastric compartment is positioned inside the tank and includes a first vessel, a first lid for securing to the first vessel, and a sieve for collecting particles smaller than a particular size. The intestinal compartment is also positioned inside the thermoregulated bath and includes a second vessel, and a second lid for securing to the second vessel. The system also includes a delivery channel (e.g., tube) coupling the gastric compartment and the intestinal compartment, wherein the particles collected by the sieve are transferred from the gastric compartment to the intestinal compartment through the delivery channel. The sieve comprises an interior chamber, a plurality of pores on at least a surface of the sieve such that the particles smaller than the particular size enter through the plurality of pores into the interior chamber of the sieve, and a hole sized and configured to receive the delivery channel coupling the gastric compartment and the intestinal compartment.

In another aspect, an in vitro simulator of the human gastrointestinal system is provided. The in vitro simulator comprises a thermoregulated bath maintained a specific temperature, a first beaker positioned inside the thermoregulated bath, wherein an opening of the first beaker is covered by a first lid, wherein the first beaker includes a sieve configured to separate out particles smaller than a particular size, a second beaker positioned inside the thermoregulated bath, wherein an opening of the second beaker is covered by a second lid, and a delivery channel passing through the first lid and the second lid, wherein the delivery channel includes a first channel end coupling with the sieve and a second channel end positioned inside the second beaker. The in vitro simulator mimics in vivo conditions of the human gastrointestinal system.

Advantages of the gastrointestinal simulator system of the present invention has at least the following advantages:
Beakers as containers for the stomach and intestine: Traditional simulators use sophisticated containers for the stomach that are jacketed to be heated with water passing between the walls. In contrast, the containers used in the gastrointestinal simulator system of the present invention are glass beakers that are readily available in the market, and the heating system used is a thermoregulated water bath where the beakers are placed.

A low-cost system: The construction and development cost of the gastrointestinal simulator system is approximately $2,400 USD.

A low-volume system: The gastrointestinal simulator system is a low volume system that can be run at different volumes of sample, which reduces costs of enzymes and reagents for the total system of the present invention and, consequently, operating costs.

Alerts: The gastrointestinal simulator system has an incorporated alert system that alerts a user of the different steps during digestion. The alert system provides at least visual alerts and audible alerts. The alert system may also provide alerts via personal devices, such as mobile phones.

Continuous and automated controls: Software for the gastrointestinal simulator system allows continuous, dynamic, and automated control of the gastrointestinal simulator system. This software allows, for example, for the control of pumps, pH control, voice alert, and time monitoring. The software also, at the end of each digestion run or experiment, automatically generates a report(s) with all the details of the samples, volumes, time, pH levels, temperatures, and other relevant information described herein. This software can be modified/updated by a user.

3-D printed: Various parts, such as lids of the containers, can be redesigned by a user. For example, holes can be added/eliminated by changing a corresponding 3D template.

Quick set up: The gastrointestinal simulator system can be set up quickly by purchasing certain parts (all easily accessible) and custom printing out other parts, such as lids, stirrer paddles, and sieve.

Camera monitoring: The gastrointestinal simulator system has cameras for monitoring. These cameras are located inside the water bath and allow the monitoring of digestion. The cameras may revolve around the containers to obtain images of the digestion from different perspectives.

Manual intervention: The gastrointestinal simulator system allows for physical, manual intervention to be carried out, simultaneously with the automated process provided by the software. For example, if a pH problem is detected but cannot be automatically resolved, a user can physically open a valve to release hydrochloric acid to finish adjusting the pH, by pressing a button or the like.

Compact size: The size of the gastrointestinal simulator system makes it suitable for installation in almost any laboratory since its compact configuration takes very little space. For example, in an embodiment, the water bath has dimensions of 124 cm (width) by 61 cm (depth) by 90 cm (height), which includes components such as beakers and cameras. Other traditional systems are larger and take more space than the gastrointestinal simulator system.

Other embodiments, aspects, features, and advantages will become apparent from the reminder of the disclosure as a whole.

2.0 Structural Overview

FIG. 1A shows a block diagram of an example system 100 that simulates human gastrointestinal conditions, according to in an embodiment. The system 100 includes a gastric compartment 102, an intestinal compartment 104, a tank 106, a peristaltic pump 108, one or more optional cameras 110, a computing device 112, and a data repository 114. The gastric compartment 102 includes a beaker 102a (herein referred to as G-beaker 102a), a lid 102b (herein referred to as G-lid 102a), and a sieve 102c. The intestinal compartment 104 includes a beaker 104a (herein referred to as I-beaker 104a) and a lid 104b (herein referred to as I-lid 104b). At least the computing device 112, the data repository 114, the tank 106, the peristaltic pump 108, and one or more optional cameras 110 may be coupled via direct communication links and/or via one or more networks (directly and/or indirectly).

The system 100 also includes tubes (e.g., sampling tubes, solution delivery tubes, and gastric bolus delivery tube), sensors (e.g., pH meters, thermometer), valves, syringes, stirrers, solution sources (e.g., of hydrochloric acid and gastric solution, electrolyte solution, sodium hydroxide solution, etc.), optional revolving elements for positioning/orienting the cameras 110, and an optional rack for holding one or more elements of the system 100 above the tank 106. The computing device 112 and certain elements of the system 100, such as sensors, valves, stirrers, and revolving element may be also coupled via direct communication links and/or via one or more networks, for automated control/activation.

The system 100, as discussed herein, is a compact desktop system that simulates the human gastrointestinal conditions on a laboratory scale and in a dynamic manner. The system 100, when in use, runs or otherwise includes two different phases: a gastric phase and an intestinal phase. The gastric compartment 102 is used for gastric digestion during the gastric phase, while the intestinal compartment 104 is used intestinal digestion during the intestinal phase. The two phases can occur sequentially or concurrently. For example, in operation, the system 100 begins with the gastric phase and ends with the intestinal phase. The gastric phase begins prior to the intestinal phase beginning. After which, the gastric phase and the intestinal phase occur simultaneously. The gastric phase ends prior to the intestinal phase ending.

Prior to the gastric phase, oral food bolus is obtained. In an embodiment, oral food bolus is obtained from an oral phase. For example, during the oral phase, a food processor can be used to mince food (e.g., burger, fish, cabbage, apple pie, etc.). An example food processor for mincing food is described in co-pending provisional application 63/322,284, filed Mar. 22, 2022, the entire contents of which are hereby incorporated by reference for all purposes as if fully set forth herein. The minced food is mixed with a salivary solution and amylase (if needed) for, in an embodiment, two minutes, at 37° C. or 98.6° F., to form the oral food bolus.

During the gastric phase, the gastric compartment 102 simulates gastric digestion in an automated and/or dynamic manner. The gastric digestion is performed in the G-beaker 102a with the G-lid 102b covering the opening of the G-beaker 102a and the sieve 102c positioned inside the G-beaker 102a to collect particles smaller than a particular size (e.g., 2 mm in diameter). In an embodiment, the G-beaker 102a is a 250 mL glass beaker (or another sized glass beaker), the G-lid 102b is a polylactic acid (PLA) lid printed using a 3D printer, and the sieve 102c is a PLA sieve printed using a 3D printer.

In an embodiment, the G-lid 102b includes a plurality of holes, including holes for (1) oral food bolus inlet, where oral food bolus to be digested is added in the G-beaker 102a, (2) a pH meter to monitor the pH of matter inside the G-beaker 102a, (3) a sampling tube connected to a syringe for sampling from the G-beaker 102a, (4) a stirrer having to a motor to mix the matter inside the G-beaker 102a during digestion, (5) a solution delivery tube for hydrochloric acid (HCl) and gastric solution, (6) a solution delivery tube for enzyme solution, and (7) the gastric food bolus delivery tube, connecting the gastric compartment 102 and the intestinal compartment 104, for transferring gastric food bolus via the pump 108. The HCl is to control and maintain the pH of the gastric digestion at around 2.0 throughout the gastric phase. The G-lid 102b is sized and adapted to close the opening of the G-beaker 102a to ensure that the temperature inside remains constant during the gastric digestion.

In an embodiment, the sieve 102c includes a plurality of pores. The sieve 102c may have a shape of a donut or any other shape. The sieve 102c may be a mesh-like component. The plurality of pores is dispersed across at least one surface of the sieve 102c (e.g., top surface) so to allow particles of less than 2 mm in diameter to be collected and a hole on a surface of the sieve 102c that is sized and adapted to receive the gastric food bolus delivery tube so to allow for the transfer of the collected particles from the "stomach" (e.g., gastric compartment 102) to the "intestine" (e.g., intestinal compartment 104), which simulates in vivo conditions where only particles of 2 mm in diameter or smaller (referred to herein as gastric food bolus) are emptied from the stomach to the intestine.

In an embodiment, the sieve 102c has an interior chamber for collecting the gastric food bolus. For example, the sieve is a donut-shape component made of PLA, containing at least 200 pores of 2 mm diameter each. At the beginning of the digestion process, the sieve is located at the bottom of the G-beaker and the gastric food bolus delivery tube connecting the G-beaker and the I-beaker is fitted to a hole on the sieve. The external diameter of the sieve matches the internal diameter of the G-beaker so that the sieve fits within the G-beaker and does not float while in use. The sieve may be weighted so that the sieve remains at the bottom of the G-beaker.

The sieve may be shaped differently. For example, the sieve may not have an interior chamber. Instead, the sieve may be a disc-shaped component that separates the G-beaker into two chambers: a top chamber and a bottom chamber. At the beginning of the digestion process, the sieve is positioned within the G-beaker (below the stirrer), and the gastric food bolus delivery tube connecting the G-beaker and the I-beaker is fitted to a hole on the sieve. The diameter of the sieve matches the internal diameter of the G-beaker so that the sieve fits within the G-beaker. The plurality of pores across the surface of the sieve filters out particles larger than 2 mm in diameter. Particles of 2 mm in diameter or smaller are collected in the bottom chamber of the G-beaker.

During the intestinal phase, the intestinal compartment 104 simulates intestinal digestion in an automated and/or dynamic manner. The intestinal digestion is performed in the I-beaker 104a with the I-lid 104b covering the opening of the I-beaker 104a. In an embodiment, the I-beaker 104a is a 250 mL glass beaker (or another sized beaker), and the I-lid 104b is a polylactic acid (PLA) lid printed using a 3D printer.

In an embodiment, the I-lid 104b includes a plurality of holes, including holes for (1) gastric food bolus inlet, where the digested food (e.g., gastric food bolus) coming from the gastric compartment 102 enters the intestinal compartment 104, (2) a pH meter to monitor the pH of matter inside the I-beaker 104a, (3) a sampling tube connected to a syringe for sampling from the I-beaker 104a, (4) a stirrer having a motor to mix the matter inside the I-beaker 104a during the digestion, (5) a solution delivery tube for the enzyme solution, and (6) a solution tube for sodium hydroxide (NaOH) solution. The NaOH is to control and maintain the pH of the intestinal digestion at 7.0 throughout the intestinal phase. The I-lid 104b closes the opening of the I-beaker 104a to ensure that the temperature inside remains constant during the intestinal digestion.

Figure 2:
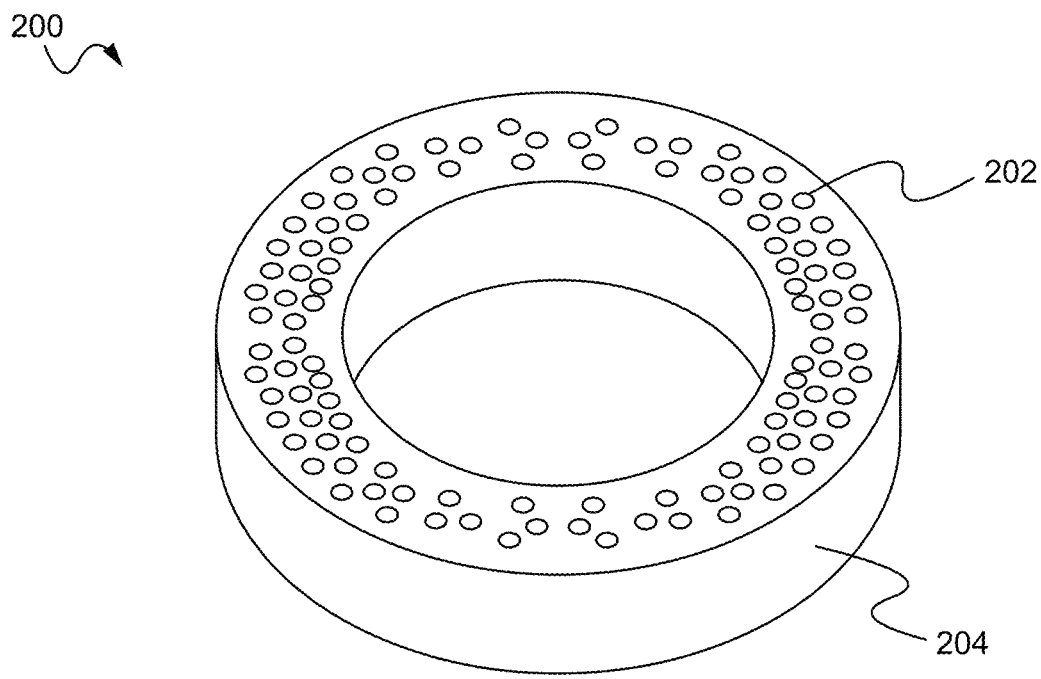
FIG. 2 illustrates an example sieve, according to an embodiment.

Using custom 3-D printed components has numerous advantages. For example, using a custom 3-D printed sieve, such as sieve 102c, has advantages of easily modifying the sieve to be able to include, at a particular location, the hole for the tube connecting the gastric compartment 102 with the intestinal compartment 104. FIG. 2 illustrates an example 3-D printed sieve 200. The sieve 102c is similarly configured as the sieve 200.

The sieve 200 of FIG. 2 fits within and, during use, may be positioned at the bottom of a beaker, such as the G-beaker 102a. The sieve 200 has a plurality of 2 mm pores 202 across at least the top surface of the sieve 200. The plurality of 2 mm pores 202 filters solids bigger than 2 mm in diameter, avoiding blockage of the tube connecting the gastric compartment 102 with the intestinal compartment 104 and mimicking what happens in the stomach (in vivo conditions), where only particles smaller than 2 mm in diameter pass through the pylorus and into the small intestine. Particles smaller than 2 mm in diameter enter the plurality of 2 mm pores 202 into an interior chamber 204 of the sieve 200. The sieve 200 also has a hole (not illustrated), on a surface (e.g., top, inner, or outer lateral surface) of the sieve 200, that is sized and configured to receive the tube connecting the gastric compartment 102 with the intestinal compartment 104. Gastric food bolus located in the interior chamber 204 of the sieve 200 are transferred to the intestinal compartment 104 via the tube that connects the gastric compartment 102 with the intestinal compartment 104.

Figure 3:
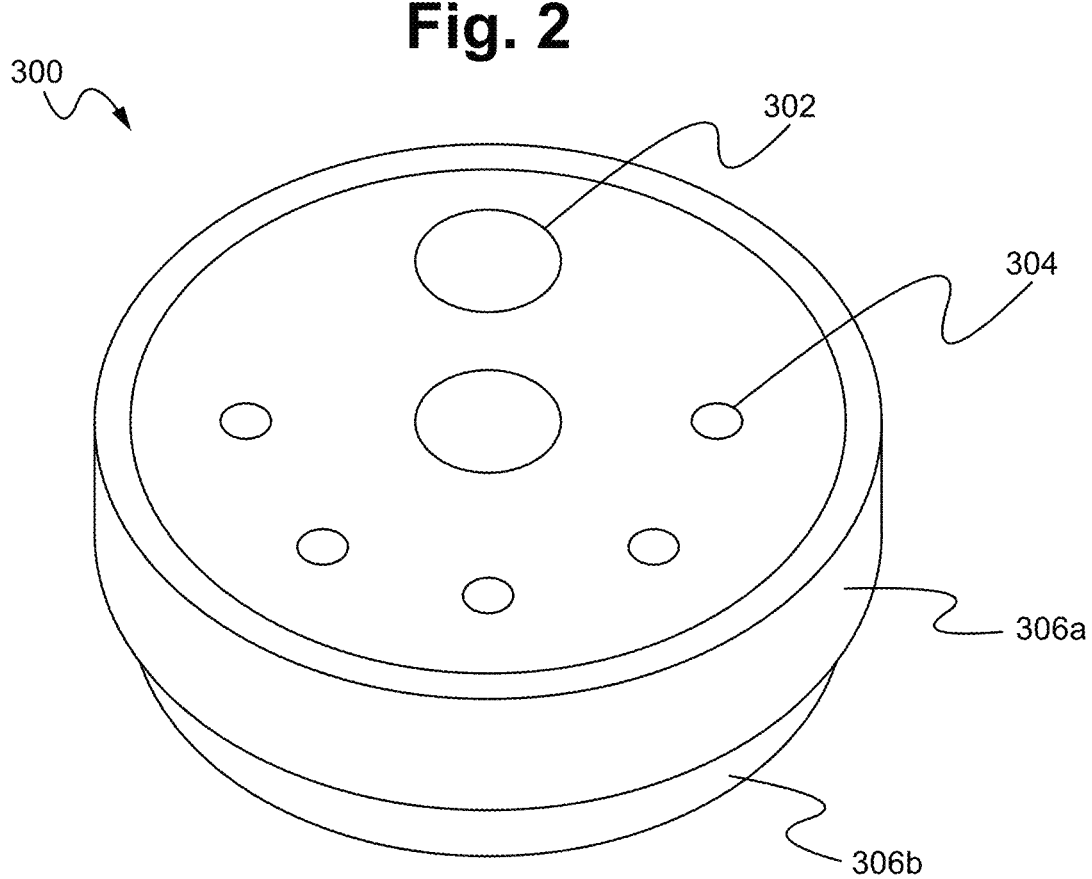
FIG. 3 illustrates an example lid, according to an embodiment.

For another example, using custom 3D-printed lids, such as G-lid 102b and I-lid 104b, has advantages of easily modifying lids to be able to secure to beakers 102a, 104a and to fit and/or include as many holes as possible or required, for inlets/outlets to and from beakers. FIG. 3 illustrates an example 3-D printed lid 300. The G-lid 102b and the I-lid 104b are similarly configured as the lid 300.

The lid 300 of FIG. 3 closes the opening of a corresponding beaker, such as the G-beaker 102a or the I-beaker 104a, and ensures that the temperature inside remains constant. The lid 300 includes at least six holes. In FIG. 3, the lid 300 has two larger-sized holes 302 and at least four smaller-sized holes 304. Each of the larger-sized holes 302 has a 14 mm diameter (or otherwise having a stirrer stem diameter), and each of the smaller-sized holes 304 has a 5 mm diameter (or otherwise having a tube diameter). Each of the larger-sized holes 302 is sized and configured to receive a stirrer or a pH meter. Each of the smaller-sized holes 304 is sized and configured to receive a tube for transferring substance to and from the corresponding beaker. The lid 300 has a wider top portion 306a and a narrower bottom portion 306b. The bottom portion 306b is sized and configured to fit inside the corresponding beaker while the top portion 306a is sized and configured to sit on top of the corresponding beaker.

Figure 4:
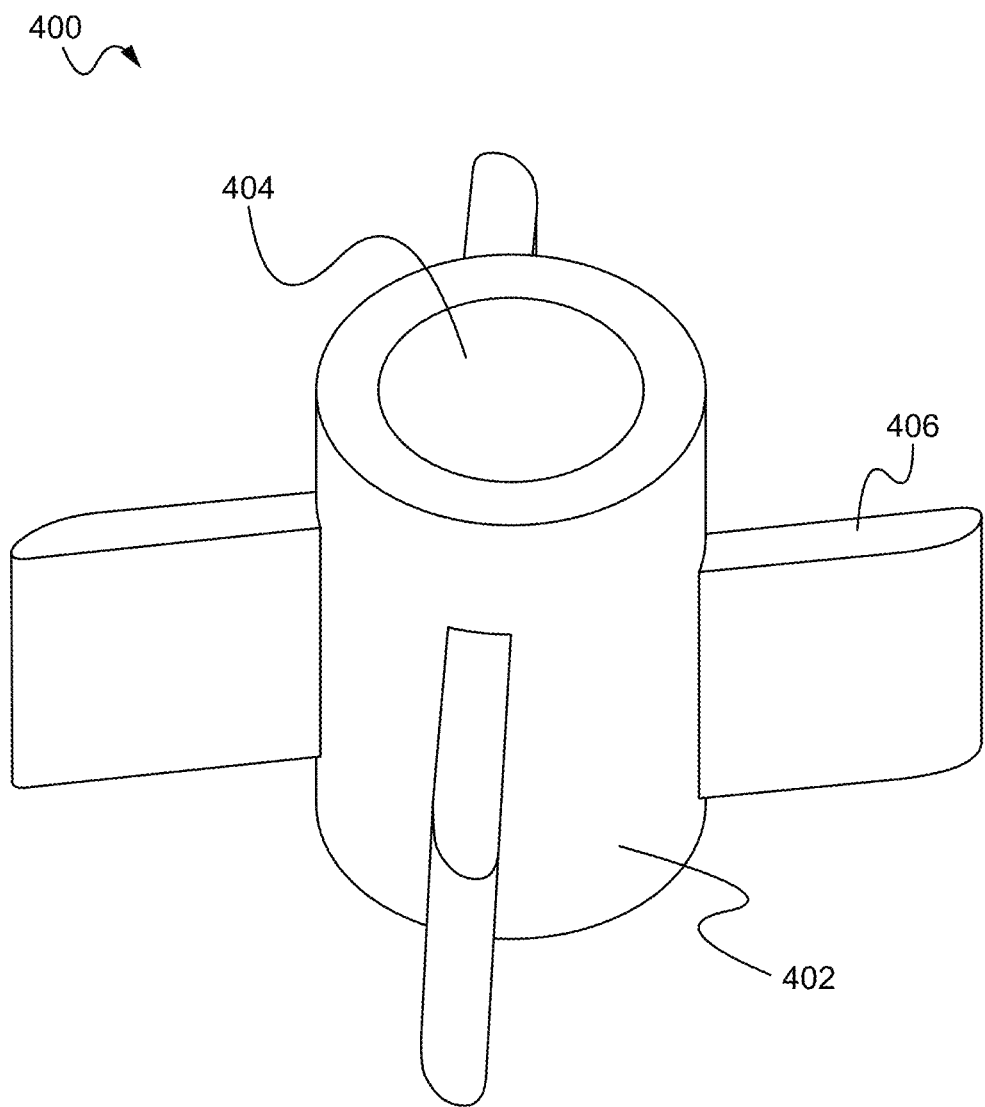
FIG. 4 illustrates an example paddle, according to an embodiment.

In an embodiment, paddles are also custom 3D-printed. A stirrer includes a stem and a paddle coupled at the bottom of the stem. FIG. 4 illustrates an example 3-D printed paddle 400. The paddle 400 includes a body 402, a plurality of fins 406 along the body 402, and a hole 404 sized and configured for receiving a stem (not illustrated). The stem has a motor that controls speed of the stirrer to simulate the movement of the digestion and to mix matter inside a beaker. The paddle 400 may include additional extensions or protrusions on the body 402 and/or the fins 406 to help break apart solids.

While it is discussed above that the 3D custom parts are printed using PLA material, other suitable materials, that are compatible with acid, can be used to print the 3D custom parts.

In operation, referring back to FIG. 1A, both compartments 102, 104 are situated inside the tank 106. The tank provides a thermoregulated bath for the compartments 102, 104. The tank 106 may be made from plexiglass or other suitable material and includes a thermometer. In an embodiment, the thermoregulated bath is maintained at the temperature of 37° C. or 98.6° F. throughout digestion. In an embodiment, the temperature of the tank 106 (bath) may be controlled/regulated using the computing device 112.

In an embodiment, one or more sports (underwater) cameras 110 are situated inside the tank 106 and communicatively coupled with the computing device 112, causing to display a live video feed for a user to monitor visually and/or to record the digestion occurring in the gastric compartment 102 and the intestinal compartment 104. Each of the cameras 110 may be coupled with a revolving element which allows the camera 110 to revolve around a compartment 102, 104 to capture a live feed from different angles.

Each set of pH meter and stirrer for a corresponding compartments 102, 104 is inserted through holes of a corresponding lid 102b, 104a. The pH meter and the stirrer (at least the paddles) are in fluid communication with matter inside the corresponding beaker 102a, 104a. Each tube in a set of solution delivery tubes for the corresponding compartment 102, 104 has one end coupled with a solution source and another coupled with a hole of the corresponding lid 102b, 104a.

The gastric food bolus tube connecting the gastric compartment 102 and intestinal compartment 104, is coupled with the peristaltic pump 108. The peristaltic pump 108 facilitates movement/emptying of digested food from the gastric compartment 102 (e.g., gastric food bolus, solids smaller than 2 mm in diameter collected by the sieve 102c) to the intestinal compartment 104. A gastric emptying rate is determined by and/or programmed by the user at the computing device 112. In an embodiment, the gastric emptying rate follows the Elashoff equation, with $\beta=1.65$, and $t_{1/2}=66.75$ min for solids. The fraction of bolus remaining in the stomach is $$f = 2^{-\left(\frac{t}{t_{1/2}}\right)^{\wedge}\beta},$$

wherein t is the time of delivery, $t_{1/2}$ is the half time of gastric digestion, and $\beta$ is a coefficient describing the shape of the curve. An ON/OFF switch of the peristaltic pump 108 may be manually controlled by the user. In an embodiment, the gastric food bolus tube passes through holes in the lids 102b, 104b, and has one end coupled with the sieve 102c and another end coupled with the lid 104b. The delivery of the gastric food bolus from the gastric compartment 102 to the intestinal compartment 104 may be automatically or manually activated.

The computing device 112 broadly represents one or more computers, such as one or more desktop computers, laptop computers, server computers, a server farm, a cloud computing platform, a parallel computer, virtual computing instances in public or private datacenters, and/or instances of a server-based application.

The computing device 112 includes one or more computer programs or sequences of program instructions that are organized to implement controlling functions, monitoring functions, notifying functions, displaying functions, and generating functions. Programs or sequences of instructions organized to implement the controlling functions may be referred to herein as a controller 112a. Programs or sequences of instructions organized to implement the monitoring functions may be referred to herein as a monitor 112b. Programs or sequences of instructions organized to implement the notifying functions may be referred to herein as a notifier 112c. Programs or sequences of instructions organized to implement the displaying functions may be referred to herein as a displayer 112d. Programs or sequences of instructions organized to implement the generating functions may be referred to herein as a generator 112e.

In an embodiment, the controller 112a is programmed to activate sensors (e.g., thermometer, pH meters), cameras, revolving elements, and/or the pump, to control the temperature of the tank, pH levels of matter in the compartments, flow rates, and/or emptying solution times into the compartments 102, 104, and to transfer particles between the compartments 102, 104. For example, the controller 112a controls delivery of HCl (to control and maintain the pH around 2.0 throughout the gastric phase) and gastric solution with electrolytes, and delivery of enzyme to the G-beaker 102a. For another example, the controller 112a controls delivery of gastric food bolus, delivery of enzymes, and delivery of NaOH (to control and maintain the pH around 7.0 through the intestinal phase) to the I-beaker 104a. For another example, the controller 112a controls activation of a revolving element based on user input during digestion. As an illustration, the left arrow key of an input device (e.g., keyboard) activates the revolving element (and by extension, a coupled camera) to move or revolve clockwise, while the right arrow key of the input device activates the revolving element (and by extension, the coupled camera) to move or revolve counter-clockwise.

In an embodiment, the monitor 112b is programmed to monitor sensor data (e.g., temperature of the tank 106, pH levels of matter in the compartments 102, 104), the digestion time, sampling times from the compartments 102, 104, and/or transferring times from the gastric compartment 102 to the intestinal compartment 104.

In an embodiment, the notifier 112c is programmed to generate a plurality of alerts (e.g., visual, audible, etc.) at different times during digestion. For example, the notifier 112 is able to notify the user, via voice, email, messaging, etc., regarding remaining digestion time, when (e.g., specific time points) samples should be drawn, when (e.g., specific time points) samples should be transferred, when generated files are available for access, and/or the like. The notifier 112 is programmed to determine contact information (e.g., email address) based on user identifier provided for a digestion experiment and use the contact information to automatically notify the user.

In an embodiment, the displayer 112d is programmed to cause to display a graphical user interface allowing the user to provide user input and to view data collected by the system 100. For example, the graphical user interface allows the user to provide parameters, such digestion time, gastric phase time, an amount of each solution (e.g., electrolyte solution, enzyme solution), solution emptying times, etc. For another example, the graphical user interface allows the user to visually monitor the gastric digestion and the intestinal digestion occurring in the gastric compartment 102 and the intestinal compartment 104, respectively.

In an embodiment, the generator 112e is programmed to generate and format a plurality of different digital data reports, including a pH and temperature report and a digestion report for a digestion experiment or run. The generator 112e is also programmed to generate file names for the different digital data reports (as well as for the multimedia files generated by the cameras 110, in an embodiment). The generator 112e is also programmed to store the plurality of different digital data reports, along with corresponding multimedia files from video recordings in an embodiment, for the digestion experiment in the data repository 114.

Computer executable instructions described herein may be in machine executable code in the instruction set of a CPU and may have been compiled based upon source code written in Python, JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the figure may represent the manner in which programmers or software developers organize and arrange source code for later compilation into an executable, or interpretation into bytecode or the equivalent, for execution by the computing device 112.

The computing device 112 may be coupled, indirectly or directly, to the data repository 114 that includes an experiments database. As used herein, the term "database" refers to a corpus of data, organized or unorganized, in any format, with or without a particular interface for accessing the corpus of data. Each database may be implemented using memory, e.g., RAM, EEPROM, flash memory, hard disk drives, optical disc drives, solid state memory, or any type of memory suitable for database storage. In an embodiment, the experiments database includes different digital data reports generated by the generator 112e and multimedia files (e.g., videos) generated by the cameras 110. Digital data reports generated by the generator 112e and multimedia files generated by the cameras 110 may be automatically named based on, for example, sample name or experiment date, and may be automatically stored in the experiments database according to a particular data structure that allows the digital data reports and/or multimedia files to be served and/or read as quickly as possible.

The elements in FIG. 1 are intended to represent one workable embodiment but are not intended to constrain or limit the number of elements that could be used in other embodiments. For example, in an embodiment, the computing device 112 may be a server computer that hosts the gastrointestinal simulator software, which is accessible by one or more client computers (not illustrated) via one or more networks (not illustrated). A client computer may comprise a desktop computer, laptop computer, tablet computer, smartphone, or any other type of computing device that allows access to the computing device 112. A network broadly represents a combination of one or more wireless or wired networks, such as local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. The computing device 112 may be accessible over the network by a client computer to start and view a digestion experiment.

FIG. 1B shows a graphical image 150 depicting a desktop gastrointestinal simulator system. The desktop gastrointestinal simulator system is the system 100 described above. Elements of the system 100 compactly fit on a desk/table 168. Due to its compact size, the system 100 advantageously takes up minimal amount of space as compared to traditional systems and is suitable for installation in almost any laboratory. In an embodiment, the tank 106 measures approximately 124 cm (W)×61 cm (D)×90 cm (H), with components such as compartments, cameras, etc., positioned within.

As shown in the graphical image 150, a hooded rack 158 is positioned over the tank 106 and the peristaltic pump 108, which is positioned next to the tank 106. In operation, the gastric compartment 102, the intestinal compartment 104, and the cameras 110 are situated within the tank 106. The pump 108 facilitates transfer of the gastric food bolus from the gastric compartment 102 to the intestinal compartment 104 via the tube 166. A pH meter 152 is coupled to each of the gastric compartment 102 and the intestinal compartment 104 for measuring pH levels in the corresponding compartments. A syringe 154 is coupled with each of the tubes, which in turn are coupled with the compartments 102, 104, for sampling matter therein. Other tubes for adding solutions are coupled with pass-control valves 160, 162 for automated solution delivery or, alternatively, are coupled with syringes 164 for manual solution delivery. The pass-control valves 160, 162 are also configured for manual intervention such that the user is able to manually add solutions when needed. As shown in the graphical image 150, the HCl and gastric solution with electrolyte and the enzyme solution for the gastric compartment 102 are delivered via pass-control valves 160, 162, while the enzyme solution and the NaOH solution for the intestinal compartment 104 are delivered via syringe 164. The rack 158 can store/hold necessary solutions (e.g., HCl, NaOH, enzymes, etc.) for a digestion experiment. The rack 158 includes controls for activation of the pass-control valves 160, 162 for the addition of solutions into the compartments 102, 104. In this manner, since the solution sources are stored above the compartments, the addition of solutions into the compartments is facilitated by gravity instead of a pump. The computing device 112, for controlling and viewing a digestion experiment, is positioned next to the rack 158.

As depicted in the graphical image 150, the system 100 is a compact and low-volume system that can be quickly installed on a desk/table. Elements of the system 100 are readily available in the market and/or easily accessible. The system 100 is affordable to build and operate due to the nature of the elements used, making it accessible to low-resource development teams and countries. The system 100 is an in vitro digester that replicates physiological in vivo conditions to digest food, as discussed herein.

3.0 Functional Overview

In operation, at least the computing device 112 (including the controller 112a, monitor 112b, the notifier 112c, the displayer 112d, and the generator 112e), the tank 106, the pump 108, the cameras 110, the pH meters 152, the stirrers, the thermometer (not illustrated), the revolving elements (not illustrated), the valves 160, 162, and the data repository 114 interoperate programmatically in an unconventional manner, depending on digestion experiment requirements, to simulate the human gastrointestinal system.

In an embodiment, the computing device 112 controls the pH levels of the different phases, temperature of the water bath, reaction times, sampling times, and/or transferring times. The computing device 112 allows the user to monitor gastric digestion, intestinal digestion, first emptying time, and volumes of each fluid. Additionally, extra information such as name of the sample, identity of a user in charge (e.g., scientist name), date of digestion experiment, and comments are added at the beginning of the digestion experiment by the user. Once the digestion has started and throughout it, the computing device 112 allows the pH levels (e.g., of the gastric phase) to be adjusted and records the pH levels of the different phases and the temperature over the duration of the digestion. In addition to recording these parameters, the computing device 112 generates alerts (e.g., audible alerts), which welcomes the user and alerts the user with, for example, instructions to collect and/or transfer samples. The computing device 112 visually captures and/or records real-time visualization of the digestion. This is important as results depend on how good the sample homogenization process is. The computing device 112 controls the revolving elements and, by extension, the cameras 110. In this manner, different views of the gastric digestion and the intestinal digestion are captured and/or recorded. At the end of the digestion, the computing device 112 delivers one or more digital data reports with detailed information and/or one or more multimedia files of the digestion.

In an embodiment, the computing device 112 generates multiple digital data reports that are automatically formatted, named, and saved as files of one or more different formats (e.g., EXCEL spreadsheet, text files, etc.). For example, one digital data report includes sensor data, such as pH and temperature data, during the time of the digestion, and another digital data report includes information used for planning the digestion: scientist name and experiment number; initial weight of the sample and its nutrient composition; the volumes of the electrolyte solution, calcium chloride, and water for each phase; enzymes activity, their concentration and the volumes needed; concentration and volume of acid (HCl) or base (NaOH) to add in the gastric phase or intestinal phase, respectively; volume of sampling in each phase; and a brief description of the user notes prior to starting the digestion.

The computing device 112 generates a file name for each of the digital data reports and multimedia files created for a digestion experiment, based on information provided at the beginning of the digestion experiment by the user (e.g., experiment date) and/or based on type of data included in the digital data report (e.g., pH data) or content of the multimedia file (e.g., gastric video, intestinal video).

In an embodiment, if the data repository 114 is a file system, then $DATE/EXPERIMENT_NAME may be the directory structure for a filesystem-based data repository, where $DATE identifies the date of a digestion experiment, and $EXPERIMENT_NAME identifies a digestion experiment. Using such as directory structure allows experiment files to be stored together for easy, convenient access. When an API call specifying an experiment date and an experiment name, corresponding files are identified and accessed. In an embodiment, the computing device 112 alerts a user (e.g., the user in charge) that digital files are ready to be accessed.

Figure 5:
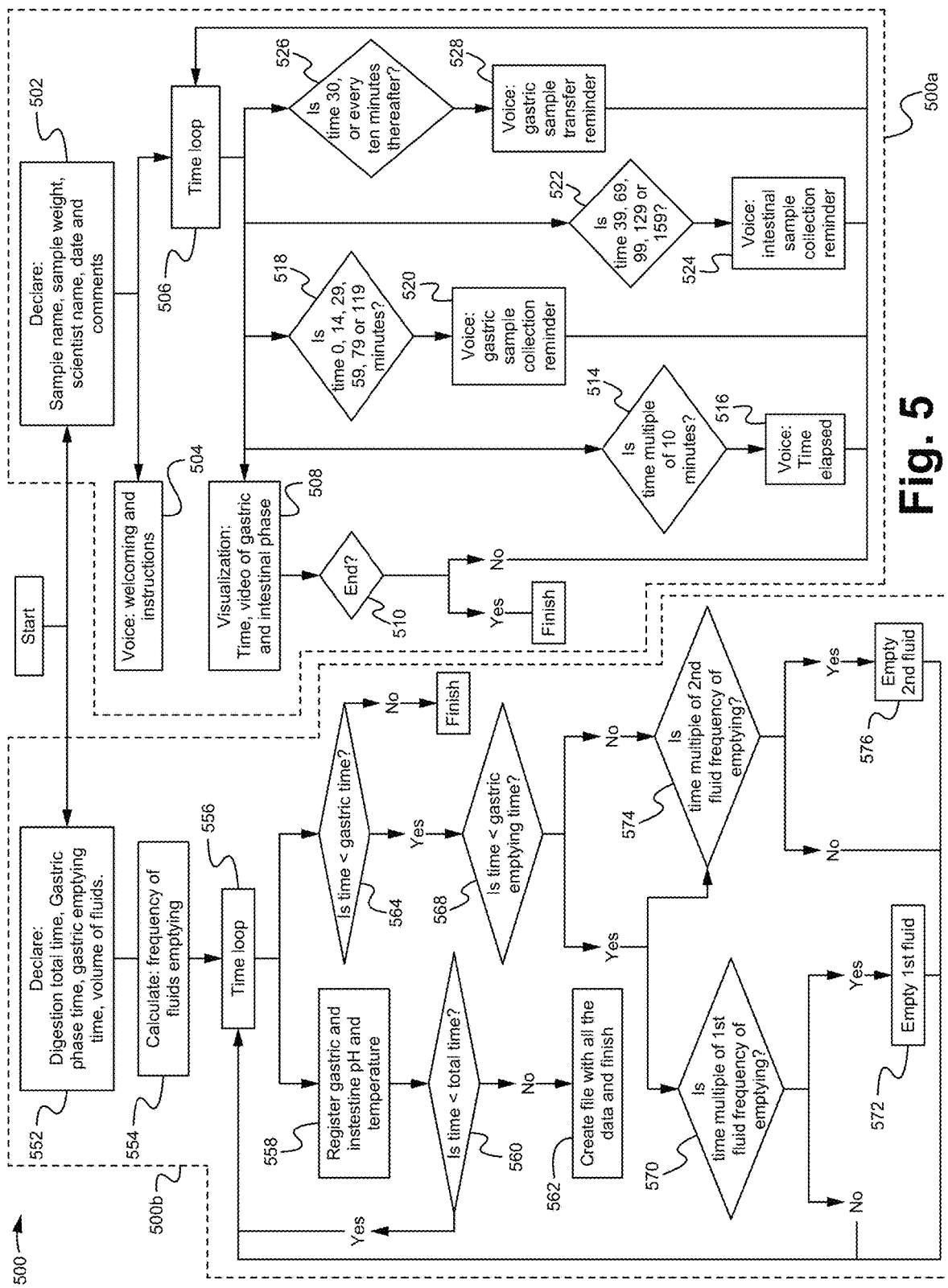
FIG. 5 illustrates an example system control flow, according to an embodiment.

FIG. 5 illustrates an example system control flow 500 of the computing device 112, according to an embodiment. The control flow 500 includes two subflows 500a, 500b that occur simultaneously. Subflow 550a includes Steps 502-528, while subflow 500b includes Steps 552-576.

Subflow 500a pertains to visualization of the gastric and intestinal phases, recordation of annotations, and generation of digital data reports. At the beginning of a digestion experiment, the computing device 112 receives information, such as name of sample (e.g., oral food bolus), sample number, weight of the sample, identity of a user (e.g., scientist name), date, and optional comments, as input in a graphical user interface (GUI) from the user at Step 502. When the user clicks on a "submit and start" button, in an embodiment, after the information is input, the computing device 112 generates a welcome alert at Step 504 and begins a time loop using a timer at Step 506. Step 504 and Step 506 may occur simultaneously. The timer and/or time loop is set based on user input at Step 552. Step 522 is further described below. Step 506 is not performed until certain times (e.g., total digestion time, gastric phase time, gastric emptying time) are identified for the digestion experiment (e.g., input by the user and received by the computing device 112) at Step 552. Step 552 is further discussed below.

The timer starts visualization, counting of time, and generating of alerts, and/or collecting/transferring of samples. The computing device 112 activates the cameras 110 and starts real-time visualization of the digestion (in compartments 102, 104) in a GUI and/or recording of the digestion at Step 508. Automatically, and periodically (e.g., every 10 minutes), based on the current time determined at Step 514, the computing device 112 reminds (e.g., using voice alert) the user that the time elapsed at Step 516. If time is equal to, for example, 0, 14, 29, 59, 79, or 119 minutes, based on the current time determined at Step 518, the computing device 112 reminds (e.g., using voice alerts) the user to collect gastric samples or, if automated, that gastric samples are being collected at Step 520. The gastric samples may be used, such as by the user, for further analysis. If time is equal to, for example, 39, 69, 99, 129, or 159 minutes, based on the current time determined at Step 522, the computing device 112 reminds (e.g., using voice alerts) the user to collect intestinal samples or, if automated, that intestinal samples are being collected at Step 524. The intestinal samples may be used, such as by the user, for further analysis. If time is equal to, for example, 30 minutes or every 10 minutes thereafter until the end of digestion, based on the current time determined at Step 526, the computing device 112 reminds (e.g., using voice alerts) the user to transfer intestinal samples or, if automated, that intestinal samples are being transferred to the intestinal compartment 104 at Step 528. Although FIG. 5 illustrates four alerts (and corresponding tasks), more or less alerts may be implemented. The loop 506 continues when the timer is not yet up as determined at Step 510. When it is determined that the timer is up at Step 510, the visualization and timing ends. In an embodiment, at this time, the computing device 112 may automatically create one or more digital data reports containing comments, time of digestion, and all information received for the experiment (at Step 562).

Subflow 500b pertains to control of delivery of fluids and recording pH and temperature for the gastric and intestinal phases. At the beginning of the digestion experiment, the computing device 112 receives parameters, such as total digestion time, gastric phase time, gastric emptying time, and volumes of different fluids to be delivered to each compartment, as input in a GUI from the user at Step 552. In an embodiment, information collected in Step 502 and parameters collected in Step 552 may be collected simultaneously in the same GUI or sequentially in separate GUIs. When the user click on a "submit and start" button, in an embodiment, after the parameters are input, the computing device 112 automatically calculates the frequency of each fluid delivery (e.g., first fluid emptying frequency, second fluid emptying frequency), based on the parameters, at Step 554. The computing device 112 starts the time loop using the timer at Step 556. The same timer may be used for the time loop at Step 556 and the time loop 506.

The timer starts controlling delivery of fluids and recordation of sensor data. Periodically (e.g., every 5 seconds) and if the digestion is not completed, the computing device 112 automatically registers or records the pH and temperature of both phases at Step 558. Simultaneously, fluids are delivered automatically based on the frequency calculated. Fluid delivery is further discussed below. When the digestion is over (the time set at the beginning has passed) as determined at Step 560, the computing device 112 creates at least one digital data file with the time, pH, temperature of both phases, frequency of each fluid delivery, and/or other calculated/monitored data, at Step 562. The at least one digital data file is created and stored in the data repository 114. The computing device 112 may automatically alert the user that the at least one digital file is available for access, such as a via a voice notification or via email (e.g., via automatic email address lookup based on user identification provided at Step 502). When the current time is less than the gastric time, based on the current time determined at Step 564, it is determined whether the current time is less than the first gastric emptying time at Step 568. If it is determined that the current time is less than the first gastric emptying time at Step 568, it is determined whether the current time is a multiple of the first fluid emptying frequency at Step 570. If the current time is a multiple of the first fluid emptying frequency, then the first fluid is emptied at Step 572. If it is determined that the current time is not less than the first gastric emptying time at Step 568, then Step 570 is not performed. However, in both instances, it is determined whether the current time is a multiple of the second fluid emptying frequency at Step 574. If the current time is a multiple of the second fluid emptying frequency, then the second fluid is emptied at Step 576. In an embodiment, the first fluid may be electrolytic fluid, containing water, HCl, and calcium chloride, and the second fluid may contain an enzyme solution in water. When the current time is the gastric time as determined at Step 564, then the gastric phase ends. During the intestinal phase, fluids, including an enzyme solution and NaOH solution, are added every time there is a gastric emptying. In an embodiment, the enzyme solution and NaOH solution are added before, at the same time, or after the gastric emptying.

4.0 Graphical User Interface Implementations

Figures 6C, 6D:

FIGS. 6A-6C illustrate example graphical user interface (GUI) displays, according to an embodiment. FIG. 6A illustrates an example GUI 600 that is configured to allow the user to provide experiment information for a digestion experiment. For example, the experiment information includes name of sample (e.g., oral food bolus), sample number, weight of the sample, scientist name, date, and optional comment. Once the information is entered in GUI 600, the digestion experiment continues via a "submit and start" button.

FIG. 6B illustrates an example GUI 610 that is configured to allow the user to provide configuration data (e.g., parameters) for the digestion experiment. For example, configuration data includes digestion time, gastric phase time, an amount of electrolyte solution, an emptying time, and an amount of enzyme solution. Once the parameters are entered in GUI 610, the digestion experiment continues via a "submit and start" button.

FIG. 6C illustrates an example GUI 620 that is configured to show in real-time the gastric phase. The GUI 620 includes the experiment information, a real-time camera feed (of the Gastric compartment 102), what the real-time camera feed is of (e.g., stomach), and a comments section. The comments section may be automatically populated by the computing device 112 with sensor data such as temperature, pH level, time lapse, etc. The comments section may also be manually input by the user with user comments. The sensor data may be displayed in a separately from the user comments in the GUI 620.

When the next phase (intestinal phase) has started, the user is able to monitor the next phase via a next phase button. A GUI (not illustrated) is configured to show in real-time the intestinal phase and include a real-time camera feed of the Intestinal compartment 104 and a comments section, which may be automatically populated by the computing device 112 with sensor data and/or manually input by the user with user comments. The user is able switch between monitoring the two phases during digestion time. In an embodiment, when viewing a particular phase, the user is able to control a particular revolving element for positioning a coupled camera to capture different views of a compartment associated with that particular phase.

FIGS. 6D-6F illustrate example digital files, according to an embodiment. FIG. 6D illustrates an example pH and temperature report 650 automatically generated by the computing device 112. The report 650 may be a spreadsheet that includes all sensor data recorded by the computing device 112 during a digestion experiment. For example, columns in the report show digestion times, gastric pH levels, gastric temperatures, intestinal pH, and intestinal temperatures. The computing device 112 automatically names the report 650 and saves the report 650 in the data repository 114 after digestion is completed.

FIGS. 6E and 6F illustrate an example report template 660 for which an automatically generated digestion report is based on. The template 660 begins on FIG. 6E and continues on FIG. 6F. The digestion report may be a spreadsheet that includes comments entered by the user prior to and during the digestion and experiment planning information collected for the digestion. For example, the digestion report may include calculations determined for the digestion experiment, such as fluid delivery frequencies.

In an embodiment, the computing device 112 may automatically inform a user of the stored digital files when they become available for access. In an embodiment, the digital data files and the multimedia files are automatically named and stored in the data repository 114 according to a particular data structure that allows the digital data files and multimedia files to be served and/or read as quickly as possible.

5.0 Procedural Overview

Figure 7:
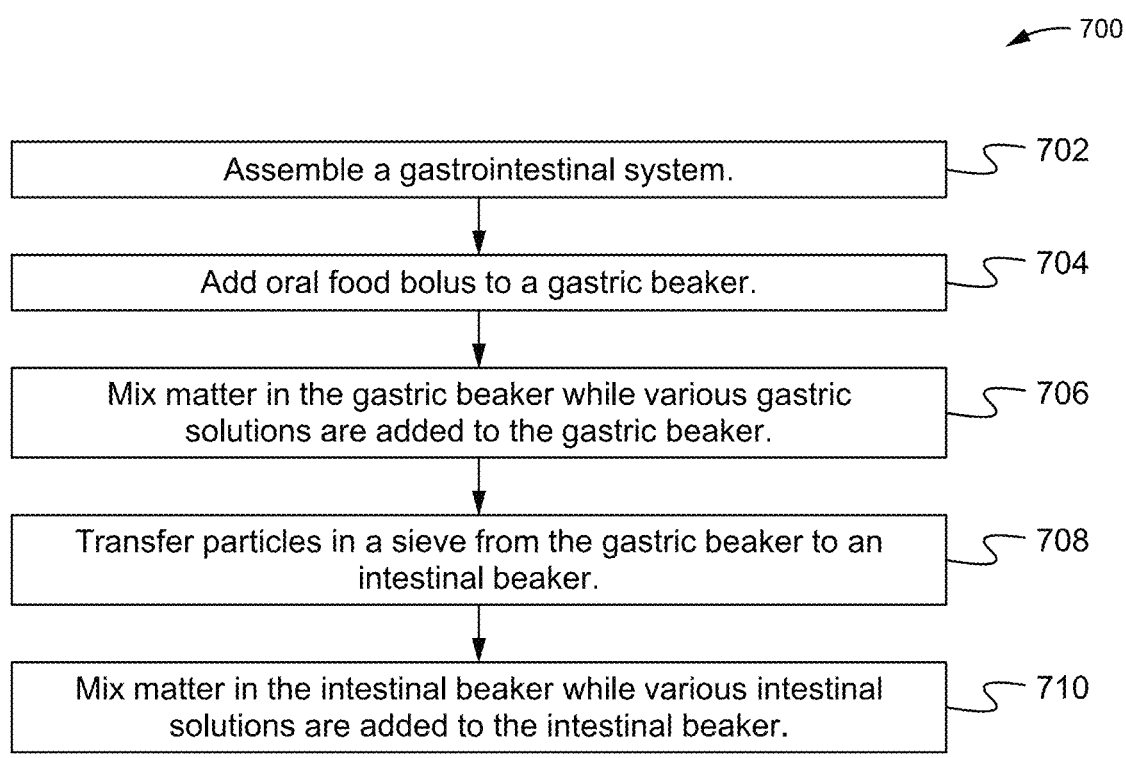
FIG. 7 illustrates an example method of using the desktop gastrointestinal simulator system, according to an embodiment.

FIG. 7 illustrates an example method 700 of using the desktop gastrointestinal simulator system, according to an embodiment. In FIG. 7, the method 700 begins at Step 702, where the desktop gastrointestinal system is assembled. The desktop gastrointestinal system includes a gastric compartment 102, an intestinal compartment 104, a tank 106, a pump 108, cameras 110, a computing device 112 hosting the gastrointestinal simulator software, a data repository 114, pH meters 152, stirrers, syringes 154, tubes 156, 166, valves 160, 162, and various solutions including HCL and gastric solution, enzyme solutions, and NaOH solution.

The gastric compartment 102 and the intestinal compartment 104 are positioned in a tank 106 which provides a thermoregulated bath. The gastric compartment 102 includes a G-beaker 102a with a sieve 102c located within and a G-lid 102b covering the opening of the G-beaker 102a. The intestinal compartment 104 includes an I-beaker 104a with an I-lid 104b covering the opening of the I-beaker 104a.

A tube couples the gastric compartment 102 and the intestinal compartment 104 via the pump 108. A first end of the tube is coupled with the sieve 102c in the gastric compartment 102, and the tube passes through a hole in the G-lid 102b and a hole in the I-lid 104b such that a second end of the tube is inside the intestinal compartment 104. In this manner, in operation, particles of less than 2 mm in diameter collected in/by the sieve 102c (gastric food bolus) move from the gastric compartment 102 to the intestinal compartment 104.

A pH meter, a stirrer, a sampling tube are inserted into a hole of each lid 102b, 104b. The pH meter, the stirrer, and the sampling tube are in fluid communication with the matter in their respective beaker 102a, 104a. The sampling tube is coupled with a syringe for sampling the matter.

A first solution source including HCl and gastric solution with electrolytes and a second solution source including enzyme solution are coupled with the gastric compartment 102 via tubes, wherein first ends of these tubes are coupled with different solution sources and second ends of these tubes are coupled with the holes of the G-lid 102b for delivering solutions into the G-beaker 102a.

A third solution source including NaOH solution and a fourth solution source including enzyme solution are coupled with the intestinal compartment 104 via tubes, wherein first ends of these tubes are coupled with different solution sources and second ends of these tubes are coupled with the holes of the I-lid 104b for delivering solutions into the I-beaker 104a. The second solution source and the fourth solution source may be the same source or different sources.

In an embodiment, a decantation funnel may be utilized to hold different solutions. For example, the decantation funnel may hold the HCl and gastric solution with electrolytes and the enzyme solution. In such a configuration, the decantation funnel holds the first solution source and the second solution source. The decantation funnel may be coupled with multiple pass-through valves to release the different solutions in the decantation funnel. Gravity, instead of pumps, is used to add the solutions into the compartments 102, 104.

Two cameras 110 are positioned in the tank 106 such that the gastric compartment 102 is in a field of view of one camera 110 and the intestinal compartment 104 is in a field of view of the other camera 110. Each of the cameras 110 may be coupled with a revolving element that allows the camera to revolve around a respective compartment.

At least the computing device 112, the tank 106, the pump 108, the cameras 110, the pH meters 152, the stirrers, the thermometer, the valves 160, 162, and the data repository 114 are communicatively coupled. The computing device 112 controls and monitors the digestion experiment.

At Step 704, oral food bolus is added to the G-beaker 102a. In an embodiment, the oral food bolus is manually added via a hole in the G-lid 102b configured for the oral food bolus inlet.

After the oral food bolus is added to the G-beaker 102a, digestion begins. Simultaneously during the following Steps 706-710, pH levels of the compartments 102, 104, the temperature of the tank 106, the cameras 110, the pump 108, the valves 160, 162, and the stirrers are monitored and/or controlled by the computing device 112. In an embodiment, during digestion, the temperature of the tank 106 is maintained at 37° C. or 98.6° F., the pH level of the gastric digestion is maintained at 2.0, and the pH level of intestinal digestion is maintained at 7.0.

At Step 706, matter in the G-beaker 102a are mixed using the stirrer while various gastric phase solutions are added to the G-beaker 102a at one or more times to maintain the pH level of the gastric digestion at 2.0. The matter is mixed for at least an identified amount of time (e.g., gastric phase time). The gastric phase solutions include solutions from the first solution source and the second solution source. During mixing, solids inside the G-beaker 102a start to break apart into particles. Particles smaller than 2 mm in diameter are collected by the sieve 102c in the G-beaker 102a.

At Step 708, the particles collected by the sieve 102c (gastric food bolus) are transferred from the G-beaker 102a to the I-beaker 104a via the tube coupling the gastric compartment 102 and the intestinal compartment 104. The pump 108 facilitates the transfer of these particles through the tube from the gastric compartment 102 to the intestinal compartment 104. The transferring of the particles occur periodically during the digestion time. For example, the transfer may occur at 30 minutes into the digestion experiment and every 10 minutes thereafter until the digestion ends.

At Step 710, matter in the I-beaker 104a are mixed using the stirrer while various intestinal phase solutions are added to the I-beaker 104a at one or more times to maintain the pH level of the intestinal digestion at 7.0. The intestinal phase solutions include solutions from the third solution source and the fourth solution source.

Simultaneously during the above Steps 706-710, the computing device 112 records sensor data (e.g., pH level data and temperature data), streams a live video feed(s) of the digestion, and generates alerts, such as via voice alerts, of time remaining and to collect samples from the compartments. In an embodiment, samples may be drawn using syringes and through tubes that are in communication with matter in the compartments 102, 104.

At 712, one or more digital data files are automatically generated and stored for the digestion. The digital files include sensor data collected during digestion and information used for planning the digestion. After the digital files are available for access, the computing device 112 alerts the user of such. In an embodiment, the digital data files are stored together with multimedia files in the data repository 114 according to a particular data structure that allows the digital data files and multimedia files to be served and/or read as quickly as possible.

6.0 Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 8:
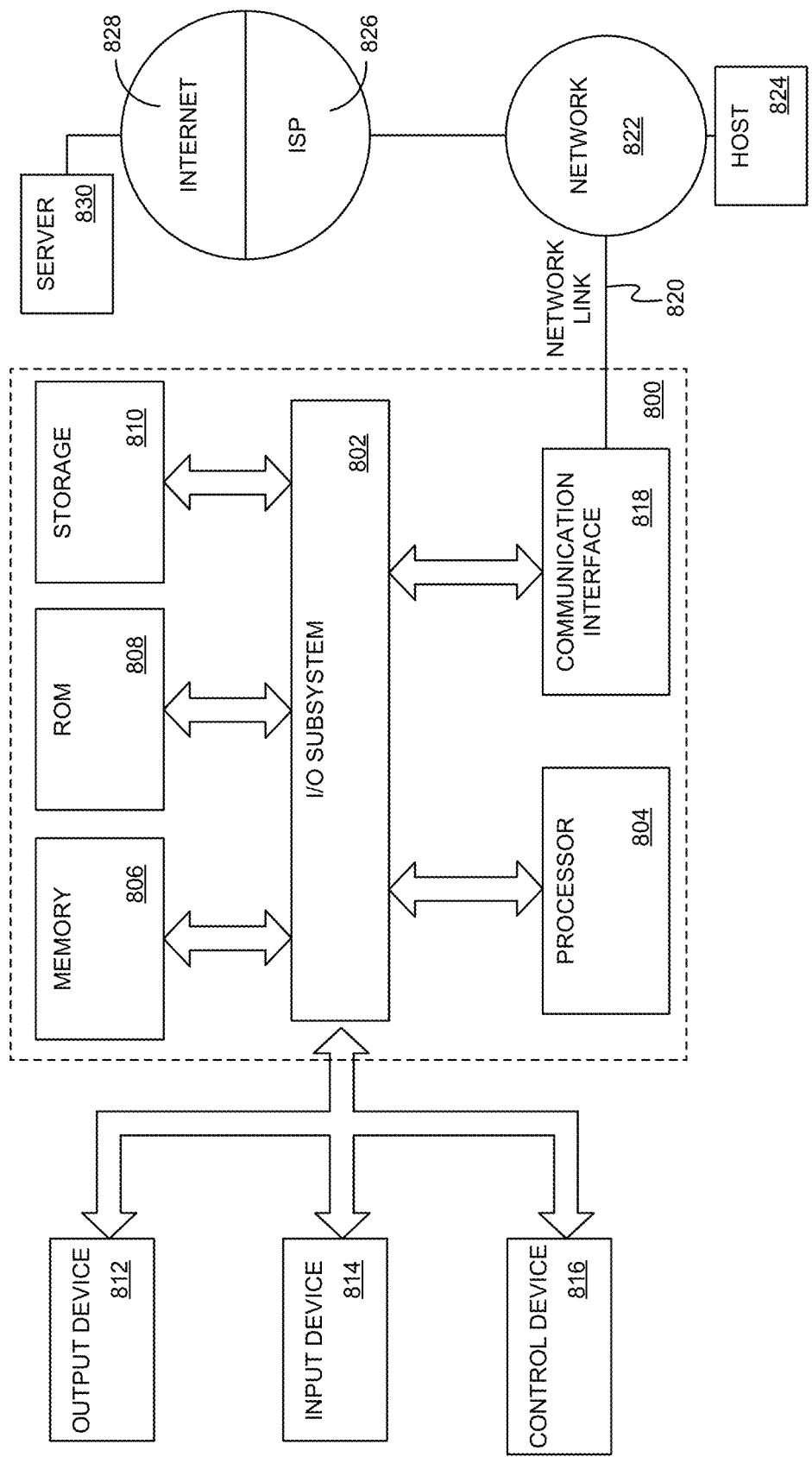
FIG. 8 illustrates a block diagram of a computing device in which the example embodiment(s) of the present invention may be embodied.

FIG. 8 is a block diagram that illustrates an example computer system with which an embodiment may be implemented. In the example of FIG. 8, a computer system 800 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 800 includes an input/output (I/O) subsystem 802 which may include a bus and/or other communication mechanism(s) for communicating information and/or instructions between the components of the computer system 800 over electronic signal paths. The I/O subsystem 802 may include an I/O controller, a memory controller and at least one I/O port. The electronic signal paths are represented schematically in the drawings, for example as lines, unidirectional arrows, or bidirectional arrows.

At least one hardware processor 804 is coupled to I/O subsystem 802 for processing information and instructions. Hardware processor 804 may include, for example, a general-purpose microprocessor or microcontroller and/or a special-purpose microprocessor such as an embedded system or a graphics processing unit (GPU) or a digital signal processor or ARM processor. Processor 804 may comprise an integrated arithmetic logic unit (ALU) or may be coupled to a separate ALU.

Computer system 800 includes one or more units of memory 806, such as a main memory, which is coupled to I/O subsystem 802 for electronically digitally storing data and instructions to be executed by processor 804. Memory 806 may include volatile memory such as various forms of random-access memory (RAM) or other dynamic storage device. Memory 806 also may be used for storing temporary variables or other intermediate information during execution of instructions to be executed by processor 804. Such instructions, when stored in non-transitory computer-readable storage media accessible to processor 804, can render computer system 800 into a special-purpose machine that is customized to perform the operations specified in the instructions.

Computer system 800 further includes non-volatile memory such as read only memory (ROM) 808 or other static storage device coupled to I/O subsystem 802 for storing information and instructions for processor 804. The ROM 808 may include various forms of programmable ROM (PROM) such as erasable PROM (EPROM) or electrically erasable PROM (EEPROM). A unit of persistent storage 810 may include various forms of non-volatile RAM (NVRAM), such as FLASH memory, or solid-state storage, magnetic disk, or optical disk such as CD-ROM or DVD-ROM and may be coupled to I/O subsystem 802 for storing information and instructions. Storage 810 is an example of a non-transitory computer-readable medium that may be used to store instructions and data which when executed by the processor 804 cause performing computer-implemented methods to execute the techniques herein.

The instructions in memory 806, ROM 808 or storage 810 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 800 may be coupled via I/O subsystem 802 to at least one output device 812. In one embodiment, output device 812 is a digital computer display. Examples of a display that may be used in various embodiments include a touch screen display or a light-emitting diode (LED) display or a liquid crystal display (LCD) or an e-paper display. Computer system 800 may include other type(s) of output devices 812, alternatively or in addition to a display device. Examples of other output devices 812 include printers, ticket printers, plotters, projectors, sound cards or video cards, speakers, buzzers or piezoelectric devices or other audible devices, lamps or LED or LCD indicators, haptic devices, actuators, or servos.

At least one input device 814 is coupled to I/O subsystem 802 for communicating signals, data, command selections or gestures to processor 804. Examples of input devices 814 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 816, which may perform cursor control or other automated control functions such as navigation in a graphical interface on a display screen, alternatively or in addition to input functions. Control device 816 may be a touchpad, a mouse, a trackball, or cursor direction keys for communicating direction information and command selections to processor 804 and for controlling cursor movement on display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 814 may include a combination of multiple different input devices, such as a video camera and a depth sensor.

In another embodiment, computer system 800 may comprise an internet of things (IoT) device in which one or more of the output devices 812, input device 814, and control device 816 are omitted. Or, in such an embodiment, the input device 814 may comprise one or more cameras, motion detectors, thermometers, microphones, seismic detectors, other sensors or detectors, measurement devices or encoders and the output device 812 may comprise a special-purpose display such as a single-line LED or LCD display, one or more indicators, a display panel, a meter, a valve, a solenoid, an actuator or a servo.

When computer system 800 is a mobile computing device, input device 814 may comprise a global positioning system (GPS) receiver coupled to a GPS module that is capable of triangulating to a plurality of GPS satellites, determining and generating geo-location or position data such as latitude-longitude values for a geophysical location of the computer system 800. Output device 812 may include hardware, software, firmware and interfaces for generating position reporting packets, notifications, pulse or heartbeat signals, or other recurring data transmissions that specify a position of the computer system 800, alone or in combination with other application-specific data, directed toward host 824 or server 830.

Computer system 800 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 800 in response to processor 804 executing at least one sequence of at least one instruction contained in main memory 806. Such instructions may be read into main memory 806 from another storage medium, such as storage 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 810. Volatile media includes dynamic memory, such as memory 806. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 802. Transmission media can also take the form of acoustic or light waves, such as those generated during radio-wave and infra-red data communications.

Various forms of media may be involved in carrying at least one sequence of at least one instruction to processor 804 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 800 can receive the data on the communication link and convert the data to a format that can be read by computer system 800. For instance, a receiver such as a radio frequency antenna or an infrared detector can receive the data carried in a wireless or optical signal and appropriate circuitry can provide the data to I/O subsystem 802 such as place the data on a bus. I/O subsystem 802 carries the data to memory 806, from which processor 804 retrieves and executes the instructions. The instructions received by memory 806 may optionally be stored on storage 810 either before or after execution by processor 804.

Computer system 800 also includes a communication interface 818 coupled to bus 802. Communication interface 818 provides a two-way data communication coupling to network link(s) 820 that are directly or indirectly connected to at least one communication networks, such as a network 822 or a public or private cloud on the Internet. For example, communication interface 818 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 822 broadly represents a local area network (LAN), wide-area network (WAN), campus network, internetwork, or any combination thereof. Communication interface 818 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 818 sends and receives electrical, electromagnetic, or optical signals over signal paths that carry digital data streams representing various types of information.

Network link 820 typically provides electrical, electromagnetic, or optical data communication directly or through at least one network to other data devices, using, for example, satellite, cellular, Wi-Fi, or BLUETOOTH technology. For example, network link 820 may provide a connection through a network 822 to a host computer 824.

Furthermore, network link 820 may provide a connection through network 822 or to other computing devices via internetworking devices and/or computers that are operated by an Internet Service Provider (ISP) 826. ISP 826 provides data communication services through a world-wide packet data communication network represented as internet 828. A server computer 830 may be coupled to internet 828. Server 830 broadly represents any computer, data center, virtual machine, or virtual computing instance with or without a hypervisor, or computer executing a containerized program system such as DOCKER or KUBERNETES. Server 830 may represent an electronic digital service that is implemented using more than one computer or instance and that is accessed and used by transmitting web services requests, uniform resource locator (URL) strings with parameters in HTTP payloads, API calls, app services calls, or other service calls. Computer system 800 and server 830 may form elements of a distributed computing system that includes other computers, a processing cluster, server farm or other organization of computers that cooperate to perform tasks or execute applications or services. Server 830 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 830 may comprise a web application server that hosts a presentation layer, application layer and data storage layer such as a relational database system using structured query language (SQL) or no SQL, an object store, a graph database, a flat file system or other data storage.

Computer system 800 can send messages and receive data and instructions, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and/or stored in storage 810, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 804. While each processor 804 or core of the processor executes a single task at a time, computer system 800 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

7.0 Software Overview

Figure 9:
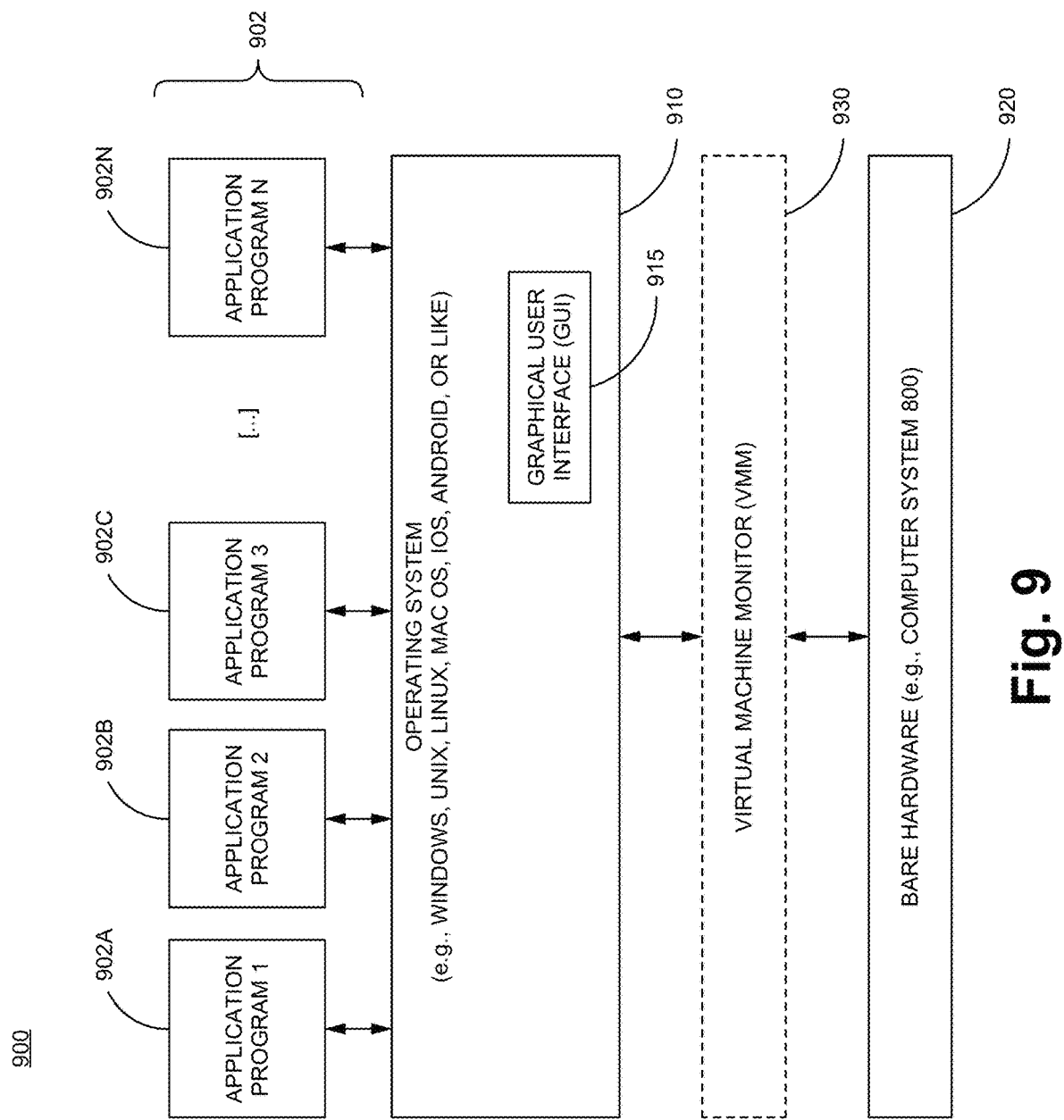
FIG. 9 illustrates a block diagram of a basic software system for controlling the operation of a computing device.

FIG. 9 is a block diagram of a basic software system 900 that may be employed for controlling the operation of computing device 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computing device 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by the system 900. The applications or other software intended for use on device 900 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of device 800. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the device 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of device 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

8.0 Other Aspects of Disclosure

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A desktop gastrointestinal simulator system comprising:
   a tank comprising a thermoregulated bath;
   a gastric compartment positioned in the thermoregulated bath inside the tank and including:
      a first vessel,
      a first lid removably secured to an opening of the first vessel, and
      a sieve for collecting particles smaller than a particular size;
   an intestinal compartment positioned in the thermoregulated bath inside the tank and including:
      a second vessel, and
      a second lid removably secured to an opening of the second vessel;
   a delivery channel coupling the gastric compartment and the intestinal compartment;
   a pump for transferring the particles collected by the sieve from the gastric compartment to the intestinal compartment through the delivery channel; and
   wherein the sieve comprises an interior chamber, a plurality of pores on at least a surface of the sieve such that the particles smaller than the particular size enter through the plurality of pores into the interior chamber of the sieve, and a hole sized and configured to receive the delivery channel coupling the gastric compartment and the intestinal compartment.

2. The desktop gastrointestinal simulator system of claim 1, wherein the first lid includes a plurality of holes including:
   a first hole adapted as an oral food bolus inlet;

a second hole adapted and configured to receive a first pH meter;
a third hole adapted and configured to receive a first sampling tube for sampling matter from the gastric compartment;
a fourth hole adapted and configured to receive a first stirrer;
a fifth hole adapted and configured to receive a first solution delivery tube for a HCl and gastric solution delivery;
a sixth hole adapted and configured to receive a second solution delivery tube for enzyme solution delivery;
a seventh hole adapted as a gastric food bolus outlet.

3. The desktop gastrointestinal simulator system of claim 2, further comprising:
the first pH meter inserted through the second hole and configured to take pH readings of matter inside the first vessel of the gastric compartment;
the first sampling tube inserted through the third hole such that a first end of the first sampling tube is in fluid communication with the matter inside the first vessel of the gastric compartment;
a first syringe coupled with a second end of the first sampling tube for sampling the matter inside the first vessel of the gastric compartment;
the first stirrer inserted through the fourth hole, the first stirrer including a paddle and a motor for mixing the matter inside the first vessel of the gastric compartment;
the first solution delivery tube having a first end of the first solution delivery tube coupled with the fifth hole;
a first solution source coupled with a second end of the first solution delivery tube for delivery of the HCl and gastric solution to the first vessel of the gastric compartment via the first solution delivery tube;
the second solution delivery tube having a first end of the second solution delivery tube coupled with the sixth hole;
a second solution source coupled with a second end of the second solution delivery tube for delivery of the enzyme solution to the first vessel of the gastric compartment via the second solution delivery tube;
a bolus delivery tube inserted through the seventh hole such that a first end of the bolus delivery tube is coupled with the sieve.

4. The desktop gastrointestinal simulator system of claim 1, wherein the second lid includes a plurality of holes including:
a first hole adapted as a gastric food bolus inlet;
a second hole adapted and configured to receive a second pH meter;
a third hole adapted and configured to receive a second sampling tube for sampling matter from the intestinal compartment;
a fourth hole adapted and configured to receive a second stirrer;
a fifth hole adapted and configured to receive a third solution delivery tube for enzyme solution delivery;
a sixth hole adapted and configured to receive a fourth solution delivery tube for NaOH solution delivery.

5. The desktop gastrointestinal simulator system of claim 4, further comprising:
the second pH meter inserted through the second hole and configured to take pH readings of matter inside the second vessel of the intestinal compartment;
the second sampling tube inserted through the third hole such that a first end of the second sampling tube is in fluid communication with the matter inside the second vessel of the intestinal compartment;
a second syringe coupled with a second end of the second sampling tube for sampling the matter inside the second vessel of the intestinal compartment;
the second stirrer inserted through the fourth hole, the second stirrer including a paddle and a motor for mixing the matter inside the second vessel of the intestinal compartment;
the third solution delivery tube having a first end of the third solution delivery tube coupled with the fifth hole;
a third solution source coupled with a second end of the third solution delivery tube for delivery of the enzyme solution to the second vessel of the intestinal compartment via the third delivery tube;
the fourth solution delivery tube having a first end of the fourth solution delivery tube coupled with the sixth hole;
a fourth solution source coupled with a second end of the fourth solution delivery tube for delivery of the NaOH solution to the second vessel of the intestinal compartment via the fourth solution delivery tube;
a bolus delivery tube inserted through the first hole such that a first end of the bolus delivery tube is coupled with the sieve and a second end of the bolus delivery tube coupled with the first hole.

6. The desktop gastrointestinal simulator system of claim 1, further comprising a first camera and a second camera, wherein the first camera is positioned such that at least a portion of the gastric compartment is in a field of view of the first camera and the second camera is positioned such that at least a portion of the intestinal compartment is in a field of view of the second camera.

7. The desktop gastrointestinal simulator system of claim 1, further comprising a computing device communicatively coupled with the pump and the tank.

8. The desktop gastrointestinal simulator system of claim 7, wherein the computing device receives parameters as input from a graphical user interface to begin a digestion experiment and, based on the parameters and during the digestion experiment, maintains the tank at a particular temperature, maintains pH levels of matter in the first vessel and the second vessel, generates audible alerts, and controls the pump to facilitate the transfer of the particles collected by the sieve from the gastric compartment to the intestinal compartment.

9. The desktop gastrointestinal simulator system of claim 8, wherein the computing device automatically generates and formats at least one digital data file the digestion experiment is completed, wherein the at least one digital data file contains sensor data generated by one or more sensors during the digestion experiment.

10. The desktop gastrointestinal simulator system of claim 8, wherein the computing device is configured to render on a display a graphical user interface that includes a live video stream of the digestion experiment from a camera.

11. The desktop gastrointestinal simulator system of claim 8, wherein the audible alerts includes alerts to collect samples from the first and second vessels.

12. The desktop gastrointestinal simulator system of claim 1, further comprising a rack positioned above the tank, wherein the rack is configured to hold one or more solution sources above the gastric compartment and the intestinal compartment such that one or more solutions added therefrom to the gastric compartment and the intestinal compartment are facilitated by gravity.

13. The desktop gastrointestinal simulator system of claim 1, further comprising at least one decantation funnel holding a plurality of solutions for digestion.

14. The desktop gastrointestinal simulator system of claim 13, wherein the plurality of solutions for digestion are added to the first vessel and the second vessel using gravity.

* * * * *

UNITED STATES PATENT AND TRADEMARK OFFICE
CERTIFICATE OF CORRECTION

| | |
|---|---|
| PATENT NO. | : 11,580,883 B1 |
| APPLICATION NO. | : 17/835750 |
| DATED | : February 14, 2023 |
| INVENTOR(S) | : Angeline Riquelme et al. |

It is certified that error appears in the above-identified patent and that said Letters Patent is hereby corrected as shown below:

In the Specification

At Column 12, Line 56, please replace "$DATE/EXPERIMENT_NAME" with "$DATE/$EXPERIMENT_NAME".

Signed and Sealed this
Eleventh Day of April, 2023

Katherine Kelly Vidal
*Director of the United States Patent and Trademark Office*